(12) United States Patent
Biswas et al.

(10) Patent No.: US 10,429,531 B2
(45) Date of Patent: Oct. 1, 2019

(54) ADVANCED NOISE REDUCTION IN ACOUSTIC WELL LOGGING

(71) Applicant: Shreya Biswas Ley, Seattle, WA (US)

(72) Inventors: Partha Bijoy Biswas, Sugar Land, TX (US); Shreya Biswas Ley, Seattle, WA (US)

(*) Notice: Subject to any disclaimer, the term of this patent is extended or adjusted under 35 U.S.C. 154(b) by 0 days.

(21) Appl. No.: 15/246,363

(22) Filed: Aug. 24, 2016

(65) Prior Publication Data

US 2017/0153346 A1 Jun. 1, 2017

Related U.S. Application Data

(60) Provisional application No. 62/208,843, filed on Aug. 24, 2015.

(51) Int. Cl.
*G01V 1/28* (2006.01)
*G01V 1/36* (2006.01)
*G01V 1/48* (2006.01)

(52) U.S. Cl.
CPC .............. *G01V 1/48* (2013.01); *G01V 1/28* (2013.01); *G01V 1/36* (2013.01); *G01V 1/364* (2013.01); *G01V 2210/1429* (2013.01); *G01V 2210/32* (2013.01); *G01V 2210/324* (2013.01); *G01V 2210/3246* (2013.01); *G01V 2210/3248* (2013.01)

(58) Field of Classification Search
USPC .......................................................... 367/38
See application file for complete search history.

(56) References Cited

U.S. PATENT DOCUMENTS

| | | | | |
|---|---|---|---|---|
| 3,689,874 A * | 9/1972 | Foster | ............. | G01V 1/366 367/40 |
| 4,853,903 A * | 8/1989 | Linville, Jr. | ............. | G01V 1/364 367/39 |
| 5,051,963 A * | 9/1991 | Linville, Jr. | ............. | G01V 1/366 367/43 |
| 5,237,538 A * | 8/1993 | Linville, Jr. | ............. | G01V 1/364 367/38 |
| 5,392,213 A * | 2/1995 | Houston | ............. | G01V 1/362 367/124 |
| 5,818,795 A * | 10/1998 | Hawkins | ............. | G01V 1/364 367/21 |
| 2010/0057366 A1* | 3/2010 | Wright | ............. | G01V 3/12 702/11 |
| 2013/0163377 A1* | 6/2013 | Poole | ............. | G01V 1/368 367/24 |
| 2014/0019058 A1* | 1/2014 | Donderici | ............. | G01V 1/30 702/17 |
| 2015/0241586 A1* | 8/2015 | Winter | ............. | G01V 1/364 702/17 |
| 2017/0090054 A1* | 3/2017 | Willis | ............. | G01V 1/364 |

* cited by examiner

*Primary Examiner* — Ian J Lobo

(57) ABSTRACT

A method and product for reducing or eliminating noise in waveforms for the purpose of improving the subsequent acoustic log processing products. The present disclosure identifies the noise signature and removes the noise signature from the formation signal through a process of deconvolution. This product and method is particularly effective where the noise signal overlaps in the time domain and in the frequency domain with the formation signal.

15 Claims, 6 Drawing Sheets

Figure 1: Raw Waveform from Receiver 1, measured in 20 to -20 μs

Figure 2. Frequency Spectrum of Monopole Waveform, waveform on left measured in 20 to -20 μs and Frequency spectrum measured in 0 to 20kHz Figure 3. Isolated Noise and Static in Raw Waveform from Receiver 1

Figure 4. Noise waveform minus Static in Raw Waveform Receiver 1

Figure 5: Raw Waveform (left) and Deconvolved Waveform (middle) and Semblance of Deconvolved Waveform (right)

ADVANCED NOISE REDUCTION IN ACOUSTIC WELL LOGGING

CROSS REFERENCE TO RELATED APPLICATIONS

The present disclosure claims priority to provisional patent application 62/208,843.

BACKGROUND

The present disclosure relates generally to the processing of acoustic well log data and the analysis of subsurface formations. More particularly, the present disclosure relates to a product, system, and method for reducing noise in waveforms for improved processing of near-wellbore formation signals.

Noise in the acoustic signal for near-wellbore measurements, such as acoustic logging, can come from a variety of sources. For example, the noise in these near-wellbore measurements can occur as a result of the wellbore inclination, as a result of a particularly rough or "bad" hole, or as a result of drilling or tool noise. There are many geological and operational factors that can cause noise in these measurements. Although some noise may be tolerated in the waveform data and still provide a reasonably accurate processed result, too much noise or certain types of noise in these signals can create large errors in subsequent models or processed results that effect revenue computations, reservoir models, and geomechanical properties. Furthermore, the error bars seemingly acceptable within acoustic log processing, out of context from downstream uses or models, may not be acceptable in downstream models as that error is integrated over larger distances or depths because once that dataset is integrated into larger models, then that discrete error propagates and compounds, often creating large discrepancies in geomechanical properties, reservoir size, or other important data-driven models. Therefore, it is important to view the error in the scope of the larger, downstream implications.

A large source of error for acoustic log processing is the inclusion of noise signal when processing. For example, when computing a common acoustic logging processed product such as slowness, otherwise known as tying time-to-depth, the noise signal skew the processed time-to-depth tie to be faster or slower than is reasonable for the formation. This result would then not correlate accurately with the geological properties of the subsurface formation and would create propagating errors in the seismic models relying on this time-to-depth tie. Seismic data may be used to approximate a time-to-depth tie and is sometimes used to roughly verify the acoustic waveform processing results, but since the error bars are larger due to the measurement being taken on a larger scale, acoustic logging waveform data is more often relied upon.

Noise signals obscure the formation signal and create discrepancies such as the time-to-depth discrepancy. There are filtering methods available and widely used in the industry, but these methods have limitations and are often insufficient in effectively reducing noise in modern operations. They are insufficient in reducing noise due to the overlap in time and frequency of the noise waveforms with the formation waveforms. One example of operations causing particular problematic noise is the noise created from measurement-while-drilling tools. Another example of operations causing particular problematic noise is that caused by particularly rugged or "bad" holes. Another example of operations causing particular problematic noise is the noise caused by data collection in inclined holes. Furthermore, modern operations call for greater accuracy to stay cost-effective and profitable. In these cases, among others, the tools are run at great expense and then the data is often deemed "unusable," wasting time and money of those in the industry. In the alternative, the data is processed, the companies attempt to use, see discrepancies with other data points gathered and then toss it aside—another great expense in time, money, and resources.

Although the noise often overlaps in time and frequency with the formation, the noise signal often arrives before (preceding) or dominates the waveform data after (anteceding) the formation signal. This difference in time is often due to the fact that the noise signal does not travel through the formation medium and, therefore, does not have the same travel time. These windows in which the noise signal is dominant or the only present signal, provides an opportunity to isolate the noise signal and study its characteristics in isolation from the formation signal.

The present disclosure provides a computer product that can more effectively filter or reduce noise in acoustic logging datasets so that the data collected can be used more often, saving time and money for the companies relying on this data for their other models and computations.

The present disclosure provides a method for reducing noise in acoustic logging datasets so that more of the data collected can be used, saving time and money for the companies relying on this data for their other models and computations, thereby reducing waste.

The present disclosure provides a system for reducing noise in acoustic logging datasets so that more of the data collected can be used, saving time and money for the companies relying on this data for their other models and computations, thereby reducing waste.

The present disclosure may be automated and integrated into the drilling process or it may be utilized after the data has been collected. There is a need for an effective method of noise reduction in the industry, so that companies can make better use of more of their data, thereby reducing waste in time, resources, and energy.

SUMMARY

The present disclosure provides a method for reducing noise signal in waveforms collected during oil and gas exploration and extraction for use in the processing of acoustic log data collected. One embodiment of the present disclosure can be a computer program with a multitude of steps that allow the user to identify a noise band and reduce the impact of the noise on the formation signal. An alternative embodiment could simply be a set of steps and calculations leading to the identification noise and the removal or reduction of the noise from the formation signal. However, these embodiments should not be construed as limitations on the scope of any embodiment, but as exemplifications of various embodiments thereof. Many other variations are possible within the teachings of the various embodiments. Thus, the scope should be determined by the appended claims and their equivalents, and not by the examples given.

BRIEF DESCRIPTION OF DRAWINGS

The following detailed description of embodiments of the invention will be better understood when read in conjunction with the accompanying drawings. For the purpose of illustrating the invention, there is shown in the drawings, embodiments which are presently preferred. In the drawings, the left-most digit(s) of a reference number indicates the drawing in which the reference number first appears. The same reference numbers have been used throughout the drawings to indicate similar elements of the drawings.

DETAILED DESCRIPTION

Figure 1:
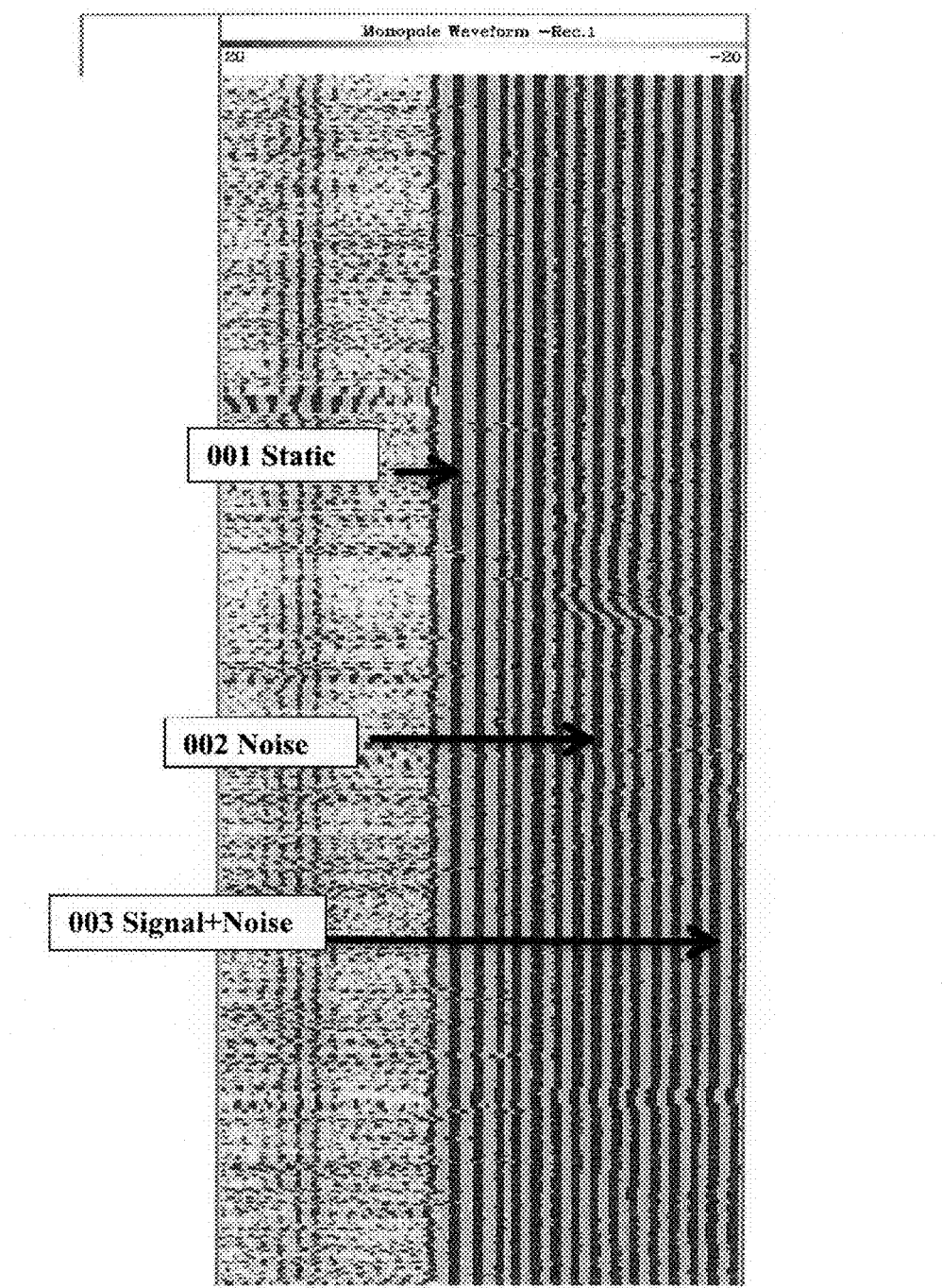
FIG. 1 illustrates a raw waveform data from a receiver 1, in accordance with an embodiment of the present invention.

For a thorough understanding of the present disclosure, reference is to be made to the following detailed description in connection with the above-mentioned drawings. Although the present disclosure is described in connection with exemplary embodiment, the present disclosure is not intended to be limited to the specific forms set forth herein. It is understood that various omissions and substitutions of equivalents are contemplated as circumstances may suggest or render expedient, but these are intended to cover the application or implementation without departing from the spirit or scope of the present disclosure. Further, it will nevertheless be understood that no limitation in the scope of the disclosure is thereby intended, such alterations and further modifications in the figures and such further applications of the principles of the disclosure as illustrated therein being contemplated as would normally occur to one skilled in the art to which the disclosure relates. Also, it is to be understood that the phraseology and terminology used herein is for the purpose of description and should not be regarded as limiting. Further, reference herein to "one embodiment" or "an embodiment" means that a particular feature, characteristic, or function described in connection with the embodiment is included in at least one embodiment of the disclosure. Furthermore, the appearances of such phrase at various places herein are not necessarily all referring to the same embodiment. The terms "a" and "an" herein do not denote a limitation of quantity, but rather denote the presence of at least one of the referenced item.

The present disclosure provides a product and method for reducing a noise signal or noise signals in near-wellbore acoustic datasets. The present disclosure is particularly used in connection with hydrocarbon exploration and extraction. Acoustic logs can be used at a number of stages in the exploration, extraction, and development process. For example, prior to fully developing a field, seismic and acoustic logging data is collected on the field. This data is then used to create reservoir models, determine the cost-effectiveness of exploiting the field, and other data-driven models used in connection with planning and developing fields. Finding and producing hydrocarbons efficiently and effectively requires an understanding of the formation characteristics, such as the hardness or softness of the formation, and an accurate idea of the depths and locations of geological properties and layers. The acoustic logging waveform data provides information about the stresses within the subterranean formation. Also, importantly, sonic and seismic data is collected and shot in the time domain with no initial, direct correlation to depth. After processing the acoustic logs, the tie from time to depth is computed, which is necessary to map out the subterranean formation and the reservoir accurately. These previous two mentioned uses are intermediate products derived from raw acoustic waveform data. Accurate maps and reservoir information are essential in placing wells, creating a field development plan, and in determining the size and scope of the reservoir. The present disclosure relates to improving the accuracy of any processing done with near-wellbore acoustic, or sonic, wave measurements and datasets by reducing or removing noise in the raw dataset. Where "raw dataset," is the waveform data prior to processing, filtering, or noise reduction, designated as $\lambda_{raw}$.

In seismic or seismology data processing, a variety of techniques have been developed and are routinely used to reduce noise in datasets or to extract relevant signals from noise due to the many environmental factors affecting the data collected. Acoustic logging, as an industry, however, relies primarily on frequency filtering to reduce noise and amplify relevant signals. In more noisy waveforms collected, acoustic log processing experts also rely on the addition of filtering in the time domain, also known as "muting." More advanced methods have been seen as unnecessary in the past due to the apparent stability of the wellbore, the confined environment, and the small-scale measurement taking place. While the reliance on frequency filtering and time domain filtering provides sometimes passable results, the unique challenges brought by unconventionals, the new tools that take measurements while drilling, the often more rugged geologic formations, and the prevalence of directional drilling in unconventional hydrocarbon exploration have created a need for more effective filtering and noise reduction techniques. Additionally, the economic margins for hydrocarbon extraction have become smaller, making it more imperative to make use of as much of the data as possible and tool advancements have also created more sensitive instrumentation that also picks up more noise as well as more relevant signal. Therefore, there is a need in the industry to adopt more effective filtering techniques leading to more effective noise reduction.

As briefly mentioned above, the current industry standard is to do one of the three following things with raw, sonic log data, where "sonic" and "acoustic" are often used interchangeably in the industry, after it has been collected: 1) raw data which has no filtering; 2) data which has undergone frequency domain filtering; and 3) the most advanced current method, data which has undergone time domain and frequency domain filtering. These techniques, however, fall short when encountering a noise signal that overwhelms the formation signal or when encountering noise signals that overlap in time and frequency with the formation signal. The noise signal often arrives preceding or dominates the waveform data after (anteceding) the formation signal. These windows in which the noise signal is dominant or the only present signal, provides an opportunity to isolate the noise signal and study its characteristics in isolation from the formation signal. The noise signal reverberates causing interference and often partially or completely masks the formation signal, overlapping with the formation signal in both time domain and in frequency domain. This overlap makes it more difficult to distinguish and separate the formation and noise signals. The present disclosure provides a method and product for reducing or eliminating noise in these cases and presents an alternative to the other methods used.

Figure 2:
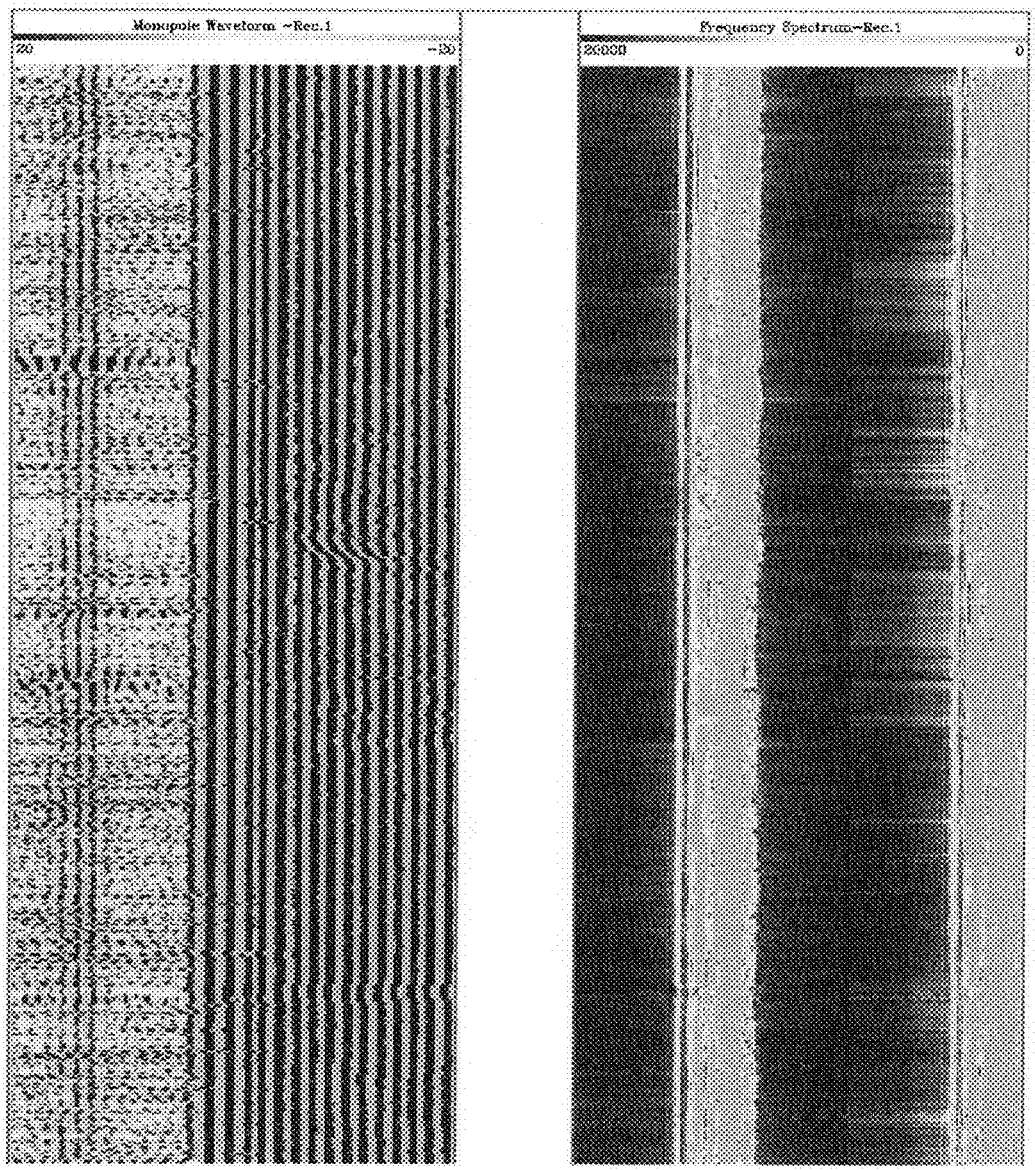
FIG. 2 illustrates an example of the raw waveform data and its corresponding frequency spectrum from a receiver 1, in accordance with the embodiment of the present invention.

For the noise reduction system, product and method, before any processing occurs, the noise must be defined and identified to distinguish it from the signal. We defined the noise as relatively unresponsive to the formation ("monochromatic" waveform), meaning that although the formation signal would change throughout the dataset and interval in response to the formation, the noise signal would be relatively unresponsive because it was being caused by static factors in the wellbore, such as the tool, or was not affected by the formation, or was not traveling through the formation. The frequency spectrum of the full, raw waveform was studied to help identify the noise, as seen in FIG. 2. This was supported by studying a broad variety of datasets and in the literature previously published in the field. Since the noise is relatively unaffected by the formation, the noise should appear as a strong forerunner when viewing the waveforms in the time domain (as seen in FIG. 1), as it reaches the tool receivers before the formation signal. This noise, since relatively unaffected by the more dynamic formation, retains the same waveform shape or character throughout the time domain and throughout the measured interval. This is in contrast to the signal of interest, which is much more responsive to the formation and change throughout the logged interval. In some cases, the noise waveforms reverberate and dampen with time as they are reflected and refracted off of the wellbore walls. In these cases, although the waveforms retain their shape or wavelength, they lessen in amplitude with time. Regardless of the rate of decline of the amplitude of these noise waveforms, any attempt to reduce the effect of noise waveforms must, not only remove or reduce the effect of the initial arrival of the noise signal, but also the subsequent, dampened noise overlapping with the formation signal. The noise waveform can be identified by choosing from a library of noise signatures based on, for example, the tool or formation; by identifying the unique noise signature for that dataset; or by constructing a set of parameters to mathematically identify the noise signature.

Figure 3:
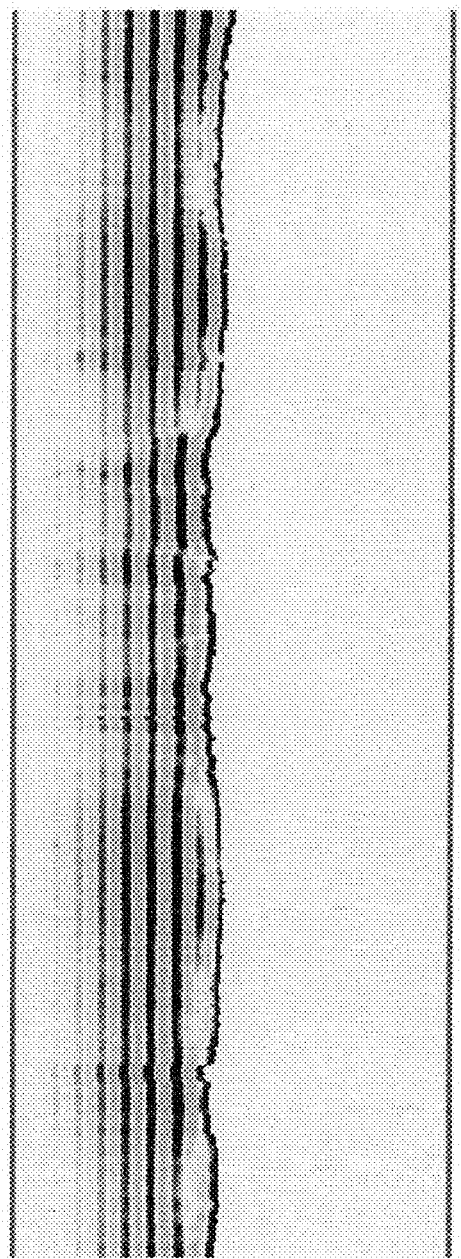
FIG. 3 illustrates the isolated noise spectrum from the receiver data shown in FIG. 1, in accordance with the embodiment of the present invention.

Once the noise waveform ($\lambda_{noise}$) has been defined and identified, the identified noise signal and the reverberating dampened signal must be isolated. Enough of the noise waveform must be isolated to sub construct a deconvolution operator composed of the noise and the dampened signal, to then remove the noise signal or reduce its effect on the signal of interest while retaining as much of the signal of interest's ($\lambda_{formation}$) character as much as possible. Of note, the aim of known predictive deconvolution routines is to extract the signal shape from the noise surrounding it. In acoustic logging, by contrast, we do not have a predetermined shape for our formation and so cannot use these known predictive deconvolution routines. While we could assume a predetermined shape, this would not be ideal and it is preferable to leave the formation signal as unaltered as possible to achieve the most accurate processed results. That said, from our research and experimentation in identifying the noise signal, we determined that the noise signal is of predetermined shape, where "predetermined" means that it can be determined from a particular dataset or for a category of datasets. Therefore, to begin the process, we isolated $\lambda_{noise}$. $\lambda_{noise}$ was isolated in time as seen in FIG. 3 since, as stated above, $\lambda_{noise}$ arrives earlier in time than the formation signal.

As we have determined our basic method, this is the overarching equation:

$$\lambda_{formation} = \lambda_{raw} + -\lambda_{decon}$$

where, $\lambda_{formation}$ is the final, deconvolved waveform that reflects the formation signal, where $\lambda_{raw}$ is the initial, unfiltered waveform, $$\lambda_{decon} = \lambda_{static}(\lambda_{noise} - \lambda_{static}) + (fcnX)^*(\lambda_{noise} - \lambda_{static})$$

where fcnX is a function to account for the change in amplitude of $\lambda_{noise}$ over time, and where $\lambda_{static}$ is the static prior to the noise waveform.

Figure 4:
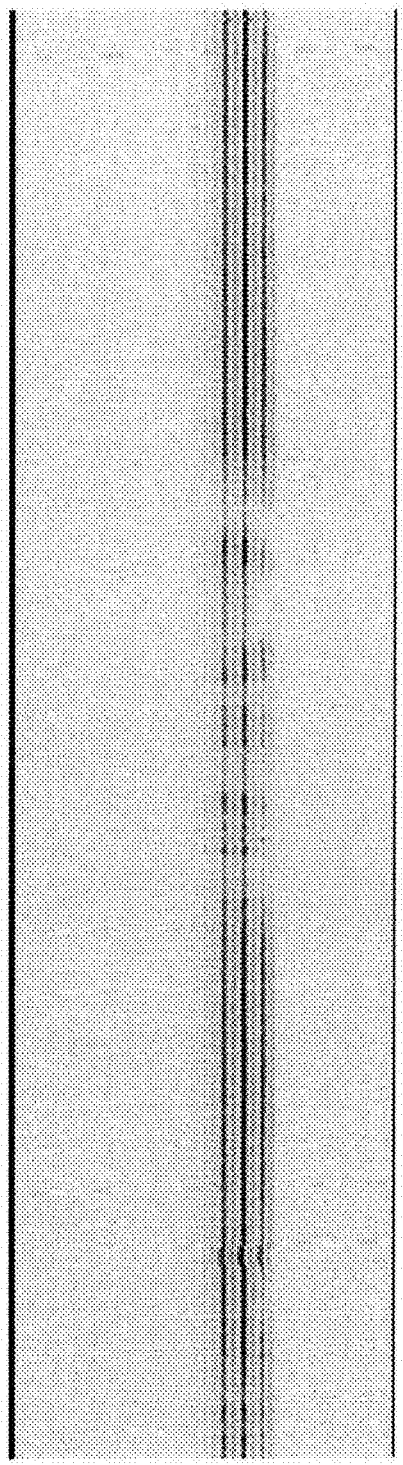
FIG. 4 illustrates a noise waveform minus the static noise from the receiver data should in FIG. 1, in accordance with the embodiment of the present invention.

In the raw waveform ($\lambda_{raw}$), there is also pure static that occurs prior to the onset of the recorded waveform. This must be removed, or muted, to construct the deconvolution operator ($\lambda_{decon}$), as pictured in FIG. 4. The pure static is also called "fore-noise." This may be muted prior to construction of the operator so that any computer products or algorithms do not factor the static into the computations below; however, alternative embodiments may not need this static to be muted while constructing the deconvolution operator.

Now that the $\lambda_{noise}$ and $\lambda_{static}$ have been identified and isolated, we must construct the remainder of the deconvolution operator, which consists of the dampening noise waveform. This dampening noise waveform must be added to the initial, isolated noise waveform. To compute the dampening noise waveform, the initial noise waveform will be repeated until the desired matrix size or waveform parameters are achieved and the initial noise waveform will be multiplied by a function that dampens the initial noise waveform over time window desired, beginning with the function not dampening the initial noise waveform at all and ending with the total dampening of the initial noise waveform.

As noted above, in some cases, the noise reverberates in time; therefore, the dampened noise waveform will retain the shape of $\lambda_{noise}$ but lessen in amplitude through the time domain. This "dampening" can be defined as a function, either a statistical function based on something like a Gaussian distribution or can be a step function, by which $\lambda_{noise}$ is multiplied by. As more time elapses in the recording window, the function multiplied by $\lambda_{noise}$ will approach zero. The rate of decline may be algorithmic or may be linear, and the preference depends on the particular dataset or the type of noise in question. For example, where the aim is to remove noise signal associated with a casing in a well, that noise signal will most likely exhibit a more linear, steep rate of decline whereas noise associated with an irregular wellbore will most likely exhibit a logarithmic, less steep rate of decline.

The initial noise waveform with the dampened noise waveforms must be added to the initial static, if muted earlier, until the resulting operator ($\lambda_{decon}$) is of equal parameters as of the original, raw waveform. The main parameter is the time window. The waveforms may be viewed as a matrix, so the raw waveform matrix and the constructed deconvolution operator matrix are of the same size. Now, that we have our matrix of "predetermined shape" consisting of purely the noise signal we can perform a deconvolution routine to remove the noise signal from the raw waveform.

Figure 5:
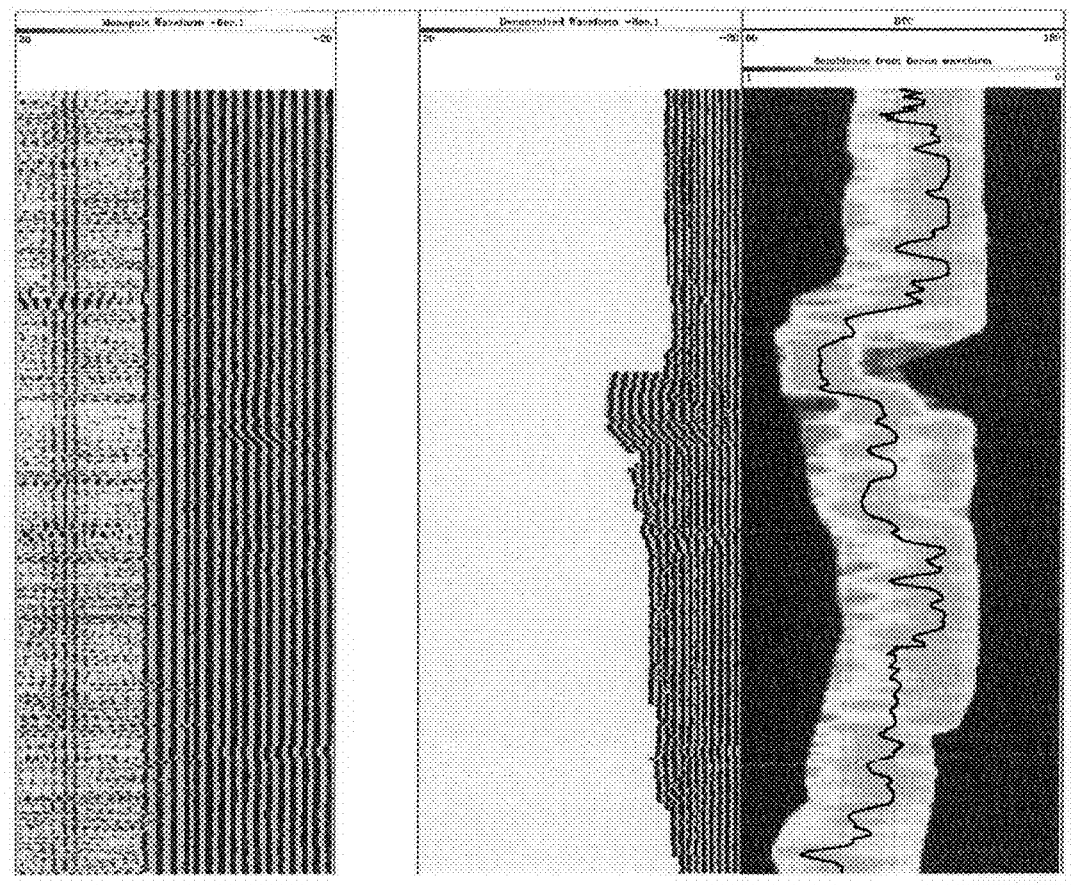
FIG. 5 illustrates the deconvolved raw waveform, in accordance with the embodiment of the present invention.

The resulting waveform, which is our final, deconvolved waveform, has noise eliminated or reduced and should be pure formation signal, or nearly pure formation signal, as seen in FIG. 5. The validity of the deconvolved waveform can be verified using well-known processing techniques such as semblance or cross-correlation. The strength of the correlation and the comparison of the results with similar computations from other datasets or measured parameters allow for determination of accuracy.

Figure 6:
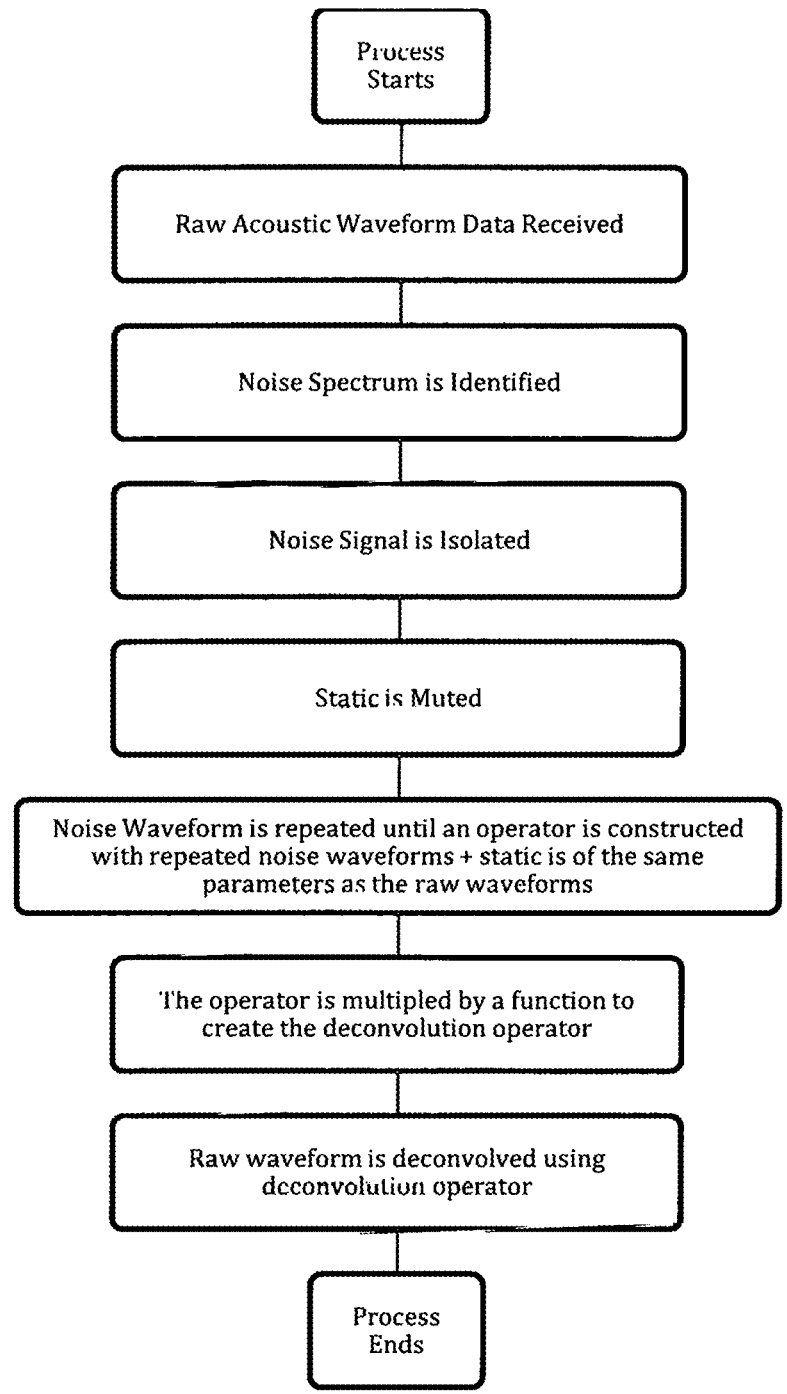
FIG. 6 illustrates the flowchart of the method outlined in the present invention, in accordance with the embodiment of the present invention.

FIG. 6 describes the method for reducing noise in collected near well-bore acoustic waveforms:

At S1 the process starts;

At S2 raw acoustic waveform data received from a tool traveling through a subterranean formation is received;

At S3 the noise spectrum is identified within the received raw acoustic log data;

At S4 the noise signal is isolated in time, where the noise signal may be specific to the formation, to the tool, or to the particular dataset;

At S5 the static or forenoise is muted or discounted from the isolated noise signal, where the static is simply white noise, for the purpose of creating the noise waveform operator;

At S6 the noise waveform is repeated until the static and the repeated noise waveforms together are of the same parameters as the raw acoustic waveform;

At S7 the repeated noise waveforms are multiplied by a function for the purpose of creating a rate of decline, where the rate of decline starting with having no dampening effect on the noise waveforms to having a complete dampening effect on the noise waveform;

At S8 the raw waveform is deconvolved using the constructed deconvolution operator to achieve a waveform with reduced or eliminated noise; and At S9 the process ends.

Preferred embodiments are described herein, including the best mode known to the inventor. Of course, variations of those preferred embodiments will become apparent to those of ordinary skill in the art upon reading the foregoing description. The inventor expects skilled artisans to employ such variations as appropriate. Moreover, any combination of the above-described elements in all possible variations thereof is encompassed unless otherwise indicated herein or otherwise clearly contradicted by context.

The invention claimed is:

1. A method for reducing or eliminating noise in near wellbore acoustic waveforms, the method comprising steps of:
   receiving raw acoustic data from a at least one sensor configured to receive acoustic waves within a wellbore, the received raw acoustic data corresponding to sensed acoustic data transmitted through a subterranean formation;
   where said raw acoustic data is of a size or parameter;
   identifying a noise spectrum within said raw acoustic data;
   isolating said noise spectrum by muting a fraction of the said raw acoustic data occurring after or before said noise spectrum in the said raw acoustic data thereby creating a preliminary noise waveform operator;
   constructing an initial deconvolution operator using said preliminary noise waveform operator, the initial deconvolution operator comprised of looping said preliminary noise waveform until looped preliminary noise waveform operator is of the same size or parameters as said raw acoustic data;
   multiplying said initial deconvolution operator by a function to create a final deconvolution operator;
   deconvolving said final deconvolution operator from said raw acoustic data to obtain a noise-reduced waveform.

2. The method as claimed in claim 1 wherein identifying said preliminary noise waveform operator further comprises determining a wave shape or wave phase by viewing frequency parameters and time parameters.

3. The method as claimed in claim 2 wherein the said final deconvolution operator has the same size or parameter as said raw acoustic data.

4. The method as claimed in claim 3 wherein said function is a mathematical function dampening amplitude of said preliminary noise waveform operator at a pre-determined rate of decline, the function does not effect the said wave shape or wave phase of said preliminary noise waveform operator.

5. The method claimed in claim 4 further comprising:
   muting a white noise waveform from said preliminary noise waveform prior to creating said initial deconvolution operator; and
   adding said white noise waveform back to said initial deconvolution operator prior to deconvolving said raw waveform.

6. A Computer Program Product (CPP) for reducing noise in near wellbore acoustic waveforms, the CPP executable by a processor and tangibly embodied in a computer readable medium and containing instructions that, when executed by the processor, cause the processor to perform operations to reduce noise in near well-bore acoustic waveforms, the operations comprising:
   receiving raw acoustic data from at least one sensor configured to receive acoustic waves within a wellbore, the received raw acoustic data corresponding to sensed acoustic data transmitted through a subterranean formation;
   where said raw acoustic data is of a size or parameter;
   identifying a noise spectrum within said raw acoustic data;
   isolating said noise spectrum by muting a fraction of the said raw acoustic data occurring after or before said noise spectrum in the said raw acoustic data thereby creating a preliminary noise waveform operator;
   constructing an initial deconvolution operator using said preliminary noise waveform operator, the initial deconvolution operator comprised of looping said preliminary noise waveform until looped preliminary noise waveform operator is of the same size or parameters as said raw acoustic data;
   multiplying said initial deconvolution operator by a function to create a final deconvolution operator;
   deconvolving said final deconvolution operator from said raw acoustic data to obtain a noise-reduced waveform.

7. The CPP as claimed in claim 6 wherein identifying said noise waveform operator further comprises determining a wave shape or wave phase by viewing frequency parameters and time parameters.

8. The CPP as claimed in claim 7 wherein the said final deconvolution operator has the same size or parameter as said raw acoustic data.

9. The CPP as claimed in claim 8 wherein said function is a mathematical function dampening amplitude of said preliminary noise waveform operator at a pre-determined rate of decline, the function does not effect the said wave shape or wave phase of said preliminary noise waveform operator.

10. The CPP claimed in claim 9 further comprising:
    muting a white noise waveform from said preliminary noise waveform prior to creating said initial deconvolution operator; and
    adding said white noise waveform back to said initial deconvolution operator prior to deconvolving said raw waveform.

11. A system for reducing noise in near wellbore acoustic waveforms, the noise reduction system comprising:
    at least one sensor configured to sense acoustic waves corresponding to depth locations within a borehole;
    a processor;

a plurality of program-memory locations coupled to the processor;

a plurality of data-memory locations coupled to the processor; and a display device configured to be controlled by the processor, wherein the plurality of program-memory locations contains instructions that, when executed by the processor, cause the processor to perform operations comprising:

receiving raw acoustic waveform data obtained from at least one sensor, the received raw acoustic waveform data corresponding to sensed near well-bore acoustic waveforms transmitted from a source travelling through a subterranean formation;

where said raw acoustic data is of a size or parameter;

identifying a noise spectrum within said raw acoustic data;

isolating said noise spectrum by muting a fraction of the said raw acoustic data occurring after or before said noise spectrum in the said raw acoustic data thereby creating a preliminary noise waveform operator;

constructing an initial deconvolution operator using said preliminary noise waveform operator, the initial deconvolution operator comprised of looping said preliminary noise waveform until looped preliminary noise waveform operator is of the same size or parameters as said raw acoustic data;

multiplying said initial deconvolution operator by a function to create a final deconvolution operator;

deconvolving said final deconvolution operator from said raw acoustic data to obtain a noise-reduced waveform.

12. The system as claimed in claim 11 wherein identifying said noise waveform operator further comprises determining a wave shape or wave phase by viewing frequency parameters and time parameters.

13. The system as claimed in claim 12 wherein the said final deconvolution operator has the same size or parameter as said raw acoustic data.

14. The system as claimed in claim 13 wherein said function is a mathematical function dampening amplitude of said preliminary noise waveform operator at a pre-determined rate of decline, the function does not effect the said wave shape or wave phase of said preliminary noise waveform operator.

15. The system claimed in claim 14 further comprising:

muting a white noise waveform from said preliminary noise waveform prior to creating said initial deconvolution operator; and adding said white noise waveform back to said initial deconvolution operator prior to deconvolving said raw waveform.

* * * * *